Aug. 28, 1956     J. R. EMERSON     2,760,646
FLUID FILTER

Filed May 4, 1953     3 Sheets-Sheet 1

John R. Emerson
INVENTOR.

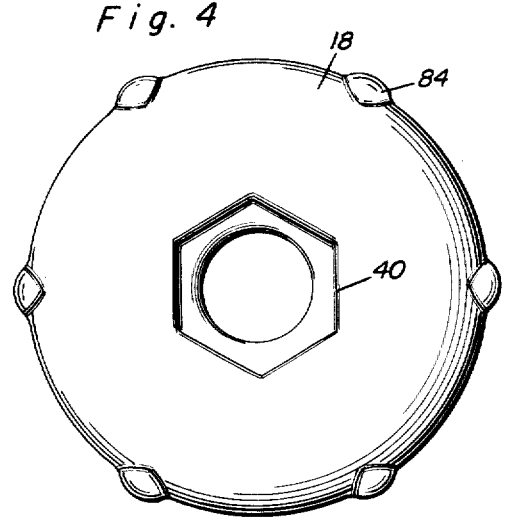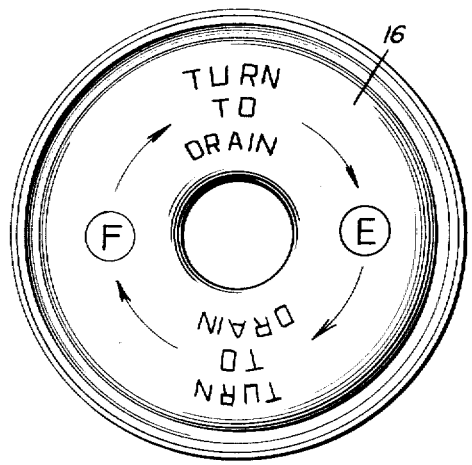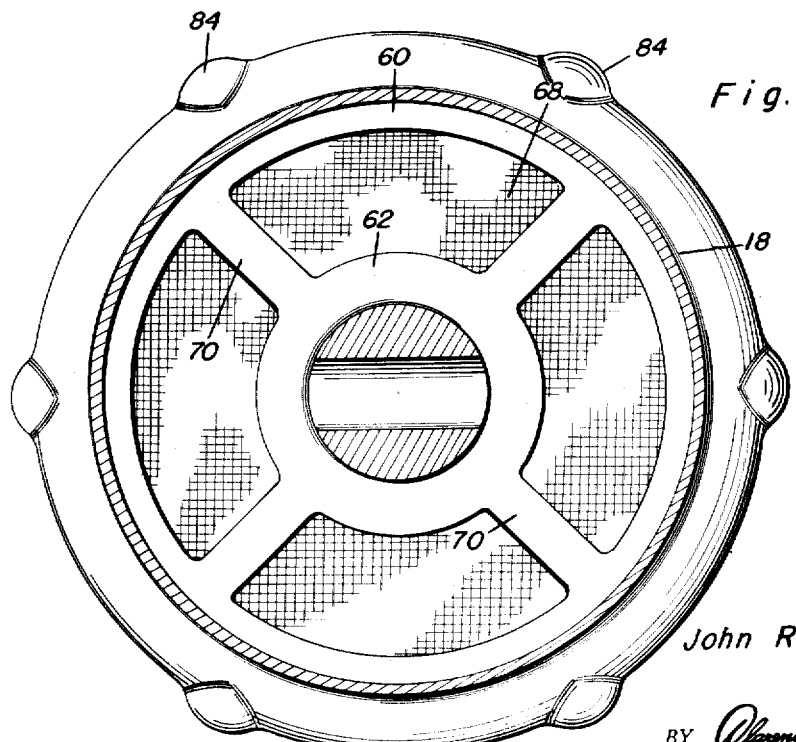

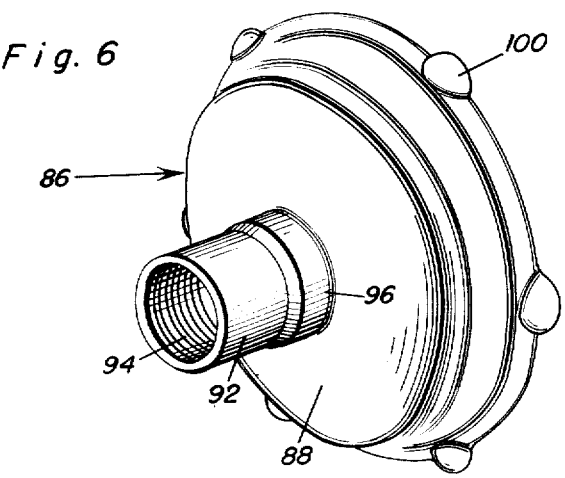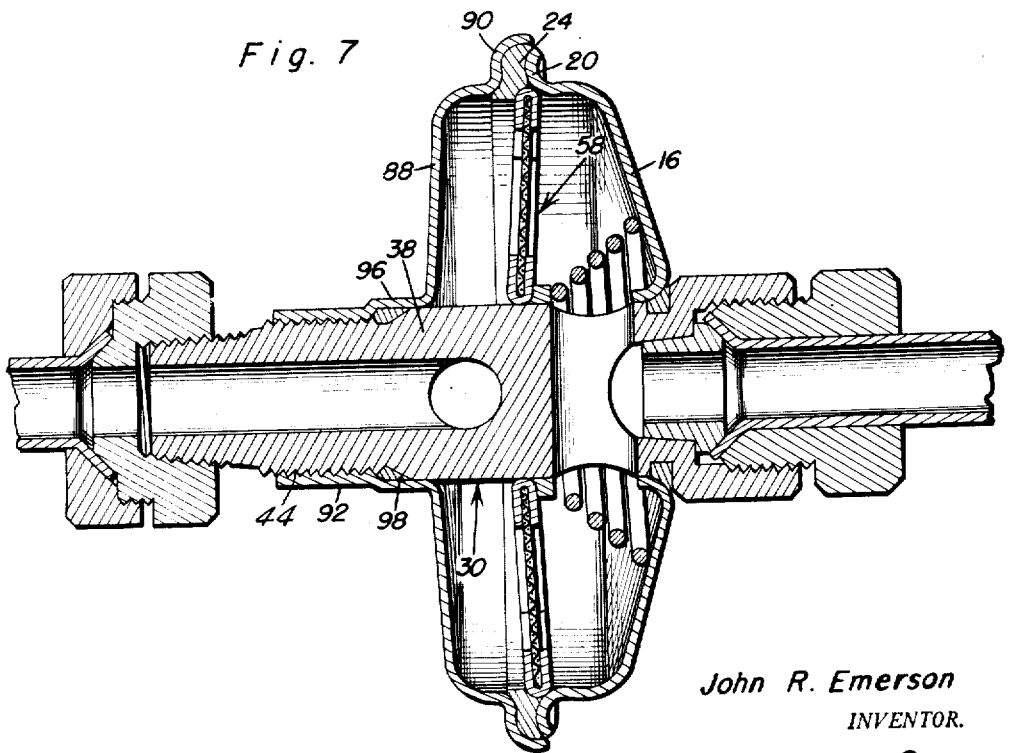

2,760,646

FLUID FILTER

John R. Emerson, Flint, Mich., assignor to Fuller & Emerson Manufacturing Company, Flint, Mich.

Application May 4, 1953, Serial No. 352,648

2 Claims. (Cl. 210—164)

This invention relates to fluid filters and more particularly to an improved construction of fluid filter assemblies which are to be interposed in a fluid carrying line.

A primary object of this invention is to provide an improved form of fluid filter which is constructed in a manner to allow periodic draining of the assembly and inspection thereof which is effected by a separation of the component parts thereof, which separation does not require the use of any tools but merely the manipulation of one of the component parts.

Another object of this invention is to provide an improved form of fluid filter which incorporates a pair of shell-like elements forming a hollow body within which the filtering action takes place, one of these elements being formed in such a manner and associated with other parts to effect assembly or disassembly of the filter assemblies in response to rotary motion imparted thereto.

Another object of this invention is to provide a fluid filter of extremely compact and economical construction which will require a minimum of space for installation and which lends itself readily to low cost mass production.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a vertical section taken substantially along the plane of section line 3—3 of Figure 2 showing details of the screen assembly on an enlarged scale;

Figure 4 is a plan view of one of the filter body members;

Figure 5 is a plan view of the other of the filter body members.

Figure 6 is a perspective view of a modified form of body member; and

Figure 7 is a longitudinal section taken through a filter embodying the modified member shown in Figure 6.

This filter assembly is particularly adapted for use in the automotive field and is intended as a replacement for the conventional sediment bowl filtering assembly commonly mounted in the fuel lines of automobiles between the fuel pump and carburetor thereof, although, of course, it will readily be appreciated that the hereinafter described assembly is not necessarily restricted to use in the automotive field but may be used in any instance requiring the use of a filter assembly.

Figure 1:
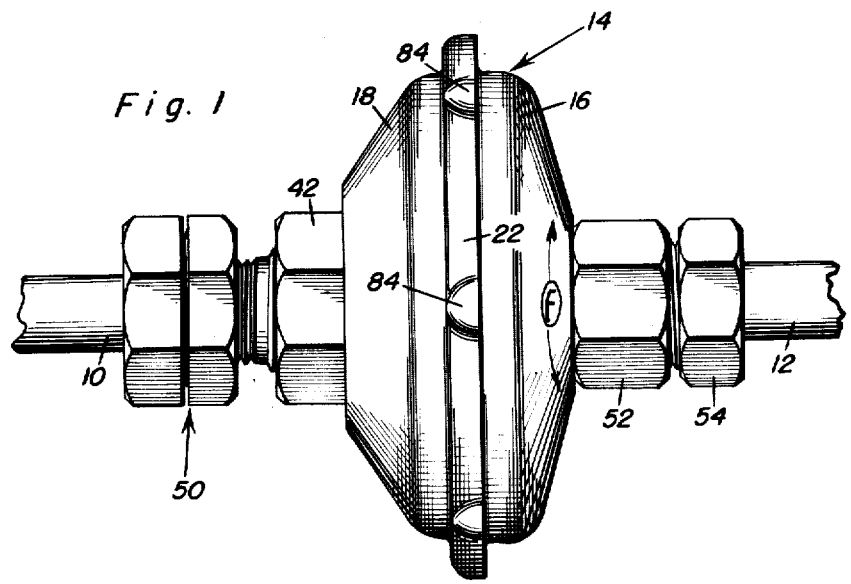
Figure 1 is an elevational view showing the novel filter interposed in a fluid line.
Figure 2:
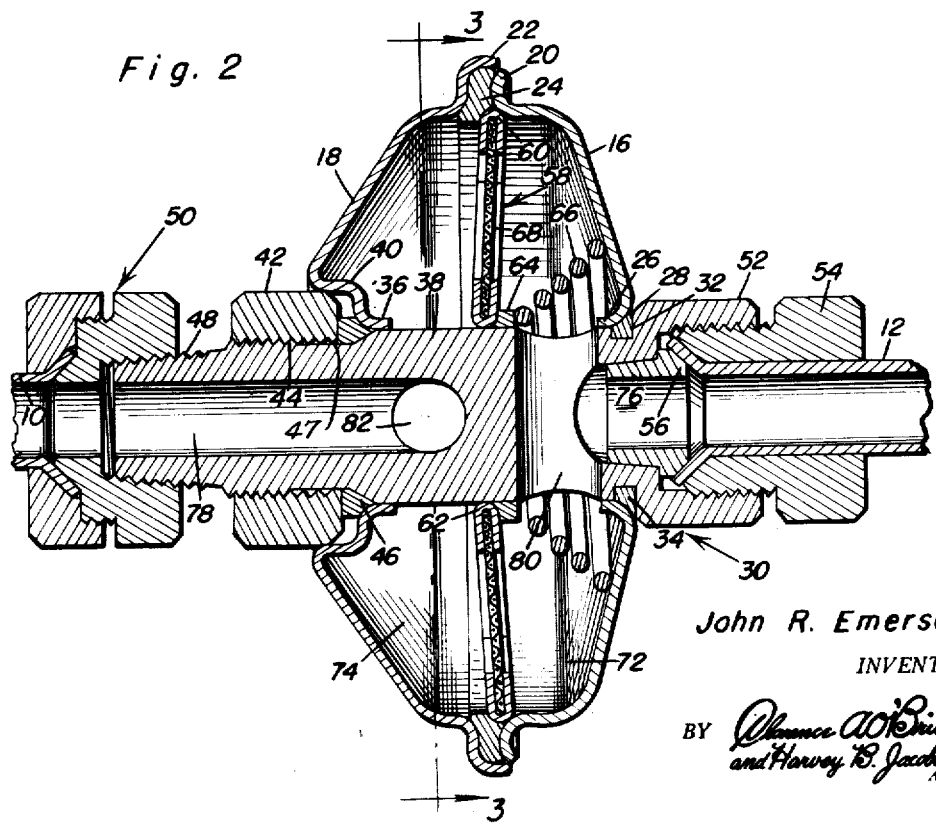
Figure 2 is an enlarged vertical section of the assembly shown in Figure 1 showing details of the filter construction and its manner of connection to the fluid carrying line.

Referring now more particularly to Figures 1 and 2, reference numeral 10 indicates a fluid line in the form of metallic tubing and reference numeral 12 indicates another portion of such line, it being preferred that the filter assembly 14 be installed with relation to the fuel line so that the portion 10 is the downstream side and the portion 12 is the upstream side of such fuel lines.

The filter assembly includes a cup-shaped or shell-like member 16 forming one side of a hollow body and another shell-like member 18 is clamped in sealed relation thereto to form along with the member 16, the hollow body within which the filtering action takes place. The two body members are provided with peripheral flanges 20 and 22 between which is disposed a resilient gasket 24 forming a seal. Body portion 16 is provided with a centrally disposed aperture defined by the inwardly flared flange 26 resting against the tapered shoulder 28 of a binding screw 30. This shoulder is provided with an annular recess 32 and an annular gasket 34 maintains a sealed engagement between the body member and binding screw.

The body member 18 is also provided with a centrally disposed aperture of the same diameter as the corresponding aperture in the body member 16 and is likewise defined by a flange 36, the flange resting upon the shank portion 38 of the binding screw. The area surrounding the aperture in body member 18 is depressed to present a hexagonal socket 40, as most clearly shown in Figure 4, and this socket embraces a nut 42 engaged on the threaded portion 44 of the binding screw disposed exteriorly of the body member 18 and engages against a gasket 46 which maintains the seal between the flange 36 and the binding screw. The binding screw 30, it will be noted, includes a reduced diameter portion 47 inwardly disposed of said threaded portion 44 upon which gasket 46 may be moved for a purpose to be subsequently apparent. The end of the binding screw adjacent the nut is provided with a standard external pipe thread 48 for receiving the conventional coupling assembly 50 which communicates the fuel line with that end of the binding screw. The opposite end of the binding screw is provided with a large hexagonal head 52 beyond the shoulder 28 and is internally threaded to receive a coupling screw 54 to cooperate therewith and with a tapered seat element 56 communicating that end of the binding screw with the fuel line portion 12, such coupling assembly being of conventional nature.

Within the body, a filtering screen 58 is provided whose outer rim 60 is positioned between the flange 20 and the gasket 24 to be sealingly engaged thereby and an inner rim 62 surrounds and engages the shank 38 of the binding screw and is sealingly engaged therewith by means of a resilient gasket 64 which is urged into engagement with these members under the action of the frusto-conical coil spring 66 which is compressed between the gasket 64 and the inner wall of body portion 16. In this respect, it will be seen that the filtering screen comprises a spider having concentric rim portions as previously described which are reversely bent upon themselves to embrace inner and outer portions of the annular screen 68 and which are interconnected by means of the radial fingers 70, as most clearly shown in Figures 2 and 3. The spider presents a resilient member which is slightly deformed under action of the coil spring to react thereagainst in maintaining proper sealing contact with the gasket 64, as shown most clearly in Figure 2.

The filtering screen assembly divides the hollow body into an inlet chamber 72 and an outlet chamber 74 and corresponding longitudinal bores or recesses 76 and 78 in opposite ends of the binding screw communicate therewith through the transverse bores 80 and 82 respectively. In this manner, fuel entering the filter assembly from the inlet portion 12 will be forced into the inlet chamber 72, through the filtering screen, into the outlet chamber and thence outwardly through the binding screw bores 82 and 78 to the downstream side 10 of the fuel line.

It will be readily apparent that when it is desired to separate these body members so as to allow water and dirt accumulated in the filter assembly to be drained therefrom, it is merely necessary to rotate the body member 18 in the appropriate direction which will, in turn, engage and rotate the nut 42 through the socket 40, thus allowing the two body members to be separated. Of course, it is not necessary in this operation to disturb the coupling connection with either of the gas lines 10 or 12 and the operation thus requires no tools in its performance. The peripheral flange 22 of the body portion 18 may be provided with radial projections 84 which will aid in turning the same. Thus when draining the filter is desirable and accomplished as described above, body member 18, filter screen 58, resilient gasket 24, and gasket 64 move to the left, as seen in Figure 2, allowing sufficient opening between body portion 16 and gasket 24 to permit drainage of fluid and the passage of foreign matter therebetween.

By this construction, not only does the assembly provide for ease of draining and cleaning the unit without the use of tools, but also there is no danger of losing or accidentally misplacing any of its component parts, since such parts cannot be detached without disassembling the entire unit from the fluid carrying line. Also, the unit provides a large filtering surface affording high capacity as compared with relatively small and extremely compact outside dimensions, requiring a minimum of installation space. Moreover, the unit is extremely rugged in construction, there being no glass or other brittle material used in its manufacture.

Referring now more particularly to Figures 6 and 7 wherein a modified form of assembly is shown, reference numeral 86 indicates the modified body member which is provided with a substantially flat center portion 88 having the peripheral flange 90 similar to the flange 22 previously described. This body member is to be utilized in conjunction with the previously described shell member 16, gasket 24, filter 58, binding screw 30 and correlated elements. Member 86 is provided with a projecting hub 92 internally threaded as at 94 to engage on the threads 44 of the binding screw, an enlarged portion 96 of the hub partially encircling the shank 38 of the binding screw and cooperating therewith and with an annular resilient gasket 98 to effect a seal when the member 86 is engaged on the shank portion 44. In all other respects, the construction and operation of the filter shown in Figure 7 is identical in construction and operation to the previously described assembly shown in Figure 2.

Insofar as the operation of the modified assembly is concerned, dismantling of the filter is accomplished by twisting the body member 86 to effect its rotation and disengagement from the threaded portion 44. In this respect, it will be noted that member 86 is constructed with radial projections 100 similar to member 18.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fluid filter comprising a hollow body split to form mutually interengaged body members, said members having registering apertures, a binding screw projecting through said apertures and provided adjacent one end with an enlarged portion engaging the outer surface of one of said members, the other end of said binding screw being threaded, means engaging the threaded portion of said binding screw for maintaining the body members in sealed interengagement, a filter partition screen forming inlet and outlet chambers in said body, means engageable between said screen and a body member urging said screen into sealed relation with said binding screw, said binding screw having bores in its opposite ends communicating with the interior of said body at opposite sides of said screen, said means engaging the threaded portion of said binding screw comprising a nut abutting the other of said body members, said other body member being centrally recessed to embrace said nut.

2. A fluid filter comprising a pair of cup-shaped body members, each having a central aperture and peripheral flange, one of said members having a recess surrounding its aperture, means for urging said body members together including a binding element projecting through said apertures and having a threaded end portion, a nut on said threaded portion and disposed in said recess, an annular gasket disposed between said peripheral flanges, an annular filter screen on said binding element and having a marginal surface on one side engaging the inner edge of said gasket, a second annular gasket embracing said binding element and engaging the inner marginal surface of said screen opposite said one side, resilient means disposed between said second gasket and one of the body members urging the second gasket against the screen and the screen against the first-mentioned gasket, said binding element being provided with passages communicating on opposite sides of said screen, one of said body members being movable on said binding element relative to the other body member for permitting axial displacement of said one body member, annular gaskets and screen relative to said other body member.

References Cited in the file of this patent

UNITED STATES PATENTS

| 1,582,859 | Shepherd | Apr. 27, 1926 |
| 1,705,042 | Babitch | Mar. 12, 1929 |
| 1,730,360 | Fisher | Oct. 8, 1929 |
| 2,007,615 | Ross | July 9, 1935 |
| 2,389,814 | Pond et al. | Nov. 27, 1945 |

FOREIGN PATENTS

| 24,460 | Great Britain | 1910 |
| 663,858 | France | Apr. 15, 1929 |